(12) United States Patent
Uematsu et al.

(10) Patent No.: US 8,909,654 B2
(45) Date of Patent: Dec. 9, 2014

(54) INFORMATION SEARCH METHOD, APPARATUS, PROGRAM AND COMPUTER READABLE RECORDING MEDIUM

(75) Inventors: Yukio Uematsu, Yokosuka (JP); Kengo Fujioka, Yokosuka (JP); Syunsuke Konagai, Yokosuka (JP); Ryoji Kataoka, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 719 days.

(21) Appl. No.: 12/742,442

(22) PCT Filed: Sep. 10, 2008

(86) PCT No.: PCT/JP2008/066356
§ 371 (c)(1),
(2), (4) Date: May 12, 2010

(87) PCT Pub. No.: WO2009/066501
PCT Pub. Date: May 28, 2009

(65) Prior Publication Data
US 2010/0257159 A1 Oct. 7, 2010

(30) Foreign Application Priority Data
Nov. 19, 2007 (JP) ................................ 2007 299784

(51) Int. Cl.
*G06F 17/30* (2006.01)
(52) U.S. Cl.
CPC .... *G06F 17/30675* (2013.01); *G06F 17/30619* (2013.01); *G06F 17/30616* (2013.01)
USPC ........................................................ 707/749
(58) Field of Classification Search
USPC .......................................... 707/736, 749, 750
See application file for complete search history.

(56) References Cited

U.S. PATENT DOCUMENTS 6,154,737 A * 11/2000 Inaba et al. ................... 707/696
(Continued)

FOREIGN PATENT DOCUMENTS

| JP | 2000 242646 | 9/2000 |
| JP | 2004 94387 | 3/2004 |

(Continued)

OTHER PUBLICATIONS

Salton, Gerard et al., "Term-weighting approaches in automatic text retrieval", Information Processing & Management, vol. 24, Issue 5, pp. 513-523, (1988).

(Continued)

*Primary Examiner* — Robert Beausoliel, Jr.
*Assistant Examiner* — Nirav K Khakhar
(74) *Attorney, Agent, or Firm* — Oblon, Spivak, McClelland, Maier & Neustadt, L.L.P.

(57) ABSTRACT

An information search apparatus is provided. The information search apparatus includes: a character string input unit configured to obtain a character string from a client; a character string information search unit configured to obtain information that includes the character string from an index DB; a similarity calculation unit configured to calculate degree of similarity between the character string and searched information; and an output unit configured to output the searched information in descending order of the degree of similarity. In the information search apparatus, the character string information search unit includes a unit configured to, when the input character string contains a plurality of words, search an index DB, based on each word, that stores words and occurrence position information of the words to obtain a distance between occurrence positions of the words, and the similarity calculation unit includes a unit configured to calculate the degree of similarity based on the distance between occurrence positions of the words.

12 Claims, 17 Drawing Sheets

(56) References Cited

U.S. PATENT DOCUMENTS

| | | | |
|---|---|---|---|
| 7,003,516 B2 * | 2/2006 | Dehlinger et al. | 707/750 |
| 2004/0172393 A1 * | 9/2004 | Kazi et al. | 707/6 |
| 2005/0138028 A1 * | 6/2005 | Liu et al. | 707/5 |

FOREIGN PATENT DOCUMENTS

| | | |
|---|---|---|
| JP | 2005 215716 | 8/2005 |
| JP | 2007 4458 | 1/2007 |

OTHER PUBLICATIONS

Robertson, Stephen E. et al., "Okapi at TREC-3", Centre for Interactive Systems Research, Department of Information Science, pp. 21-30, (1992).

Tao, Tao et al., "An Exploration of Proximity Measures in Information Retrieval", SIGIR 2007 Proceedings, Session 13: Formal Models, pp. 295-302, (2007).

* cited by examiner

INFORMATION SEARCH METHOD, APPARATUS, PROGRAM AND COMPUTER READABLE RECORDING MEDIUM

TECHNICAL FIELD

The present invention relates to an information search method, apparatus, program and computer readable recording medium, and, more particularly, relates to an information search method, apparatus, program and computer readable recording medium for establishing indexes for full-text search in order to search large document sets using character strings. Further, more particularly, the present invention relates to an information search method, apparatus, program and computer readable recording medium in the case when the character string contain equal to or more than two words (morphemes).

BACKGROUND ART

Systems have been realized for searching large document sets to extract and present documents including a character string entered as a query. In general, an information search apparatus performs processing (called lookup) for specifying documents including a character string entered as a query from among document information stored in a word index DB of the information search apparatus, and performs processing (called ranking) for calculating degree of similarity (also called score) between the character string and each document including the character string. Then, the information search apparatus displays documents (which may be document IDs) in descending order of the degree of similarity as search results. By the way, in the present specification, "document" is a set of sentences of a unit, "sentence" is a unit of character string separated by periods. For example, a document file can be considered as a list of sentences. In the following, an example of a conventional technique is described in more detail.

FIG. 1 shows a configuration example of a conventional information search apparatus 10. In FIG. 1, the information search apparatus 10, a client 20 and a network 30 form an information search system. In the figure, the word index DB 3 stores information of document sets (in the present specification, "document" may be used to mean "document set"), which are subjects of search, based on a data structure that makes it easier to search the DB, and stores inverted indexes in this example.

Conventional inverted indexes includes, for each word, document IDs in which the word occurs, and occurrence positions for the word in the document. In addition, occurrence frequency of the word may be included in the inverted indexes.

In the information search apparatus 10 shown in the figure, the character string transferred from client 20 is input by a client input reception unit 1. The input character string is divided into each word by the character string information search unit 2. Then, for each divided word, the character string information search unit 2 obtains, from the word index DB 3, document IDs of documents in which the word is included and occurrence position of the word in the document.

There is a case in which words forming the query include words divided from a compound word such as "Tokyo-To" which can be divided into "Tokyo" and "To". Since the compound word has a meaning by the adjacent two words, it is common, in the lookup processing, to perform processing for checking whether two words are adjacent with each other in the search subject document. This is called adjacency processing. A concrete example of the adjacency processing in the information search apparatus 10 is as follows.

When the input character string is "Tokyo-To", the character string information search unit 2 of the information search apparatus 10 divides "Tokyo-To" into "Tokyo" and "To". Then, the character string information search unit 2 obtains document ID in which each word obtained by the division exists, and obtains occurrence position of the word from the word index DB 3. FIG. 2 shows an example of obtained information. FIG. 2 shows that "Tokyo" is included in documents of document IDs 133, 144 and 170. In addition, it is shown that, in the document of document ID 133, occurrence frequency of "Tokyo" is 2 and "Tokyo" occurs at 5th and 22nd positions in the document, and that, in the document of document ID 144, the occurrence frequency is 3 and "Tokyo" occurs at 1st, 11th and 18th positions in the document. Similarly, as for "To", occurrence document, occurrence frequency, and word-based occurrence position are shown.

Then, the character string information search unit 2 checks presence or absence of a document in which "To" occurs adjacent to "Tokyo", and confirms that "To" occurs adjacent to "Tokyo" in the document of document ID 144. Accordingly, the character string information search unit 2 can output the document ID 144 as a document including the compound word of "Tokyo-To".

In the divided words, since it is unknown initially which words form a compound word, the character string information search unit 2 performs adjacency processing for every document having any one of words included in the query, so that there is a problem in that it requires high processing cost. In addition, in the word index DB having word-based position information, there is a problem in that a large amount of resources are required for the position information.

After the lookup processing ends as mentioned above, the similarity calculation unit 4 calculates the degree of similarity between the input character string and each document in which the character string occurs using information obtained from the word index DB 3, and transfers documents as the results in descending order of the degree of similarity to the client output unit 5.

The degree of similarity between the character string and the document is calculated by using TFIDF (Term Frequency Inverse Document Frequency) (non-patent document 1). In this case, the similarity calculation unit 4 is shown in detail in FIG. 3. As shown in FIG. 3, the similarity calculation unit 4 includes a word importance similarity calculation unit 41 for calculating degree of similarity using word importance (idf), a word frequency similarity calculation unit 42 for calculating degree of similarity using word frequency (tf). The word importance is multiplied by the word frequency so that the degree of similarity between the document and the word is obtained. The degree of similarity is calculated for every word forming the character string, and a sum of the degree of similarity for every word is calculated, so that the degree of similarity between the character string that is the query and the document is obtained.

$$sim(Q, d) = \sum_{w \in q} w_{di}$$

$$w_{di} = tf(w, d) * idf(w)$$

The above equations indicate the method for calculation. In the equations, sim(Q,d) is a function representing the degree of similarity between the query Q and the document d, $w_{di}$ indicates a score of word w constituting the query Q, wherein the score is calculated by tf (the number of times of occurrence of word w in the document d) of the word w and idf (the number of documents where w occurs/total number of documents). In this case, the degree of similarity is calculated without using position information of word.

In the case when calculating the degree of similarity by checking adjacency, there are two similarity calculation methods when a compound word "Tokyo-To" including two words of q1 "Tokyo" and q2 "To" is input, for example. One is a method for calculating TFIDF by regarding q1 and q2 as w1 and w2 respectively, and another is a method for calculating the degree of similarity by regarding the compound word in which q1 and q2 are adjacent with each other as a word w. In the former method, position information is disregarded, and in the latter method, position information is used only by setting the score to be 1 when adjacent, and setting the score to be 0 when not adjacent. In addition, in the conventional technique, even when a plurality of words are input, position information of the words is not considered.

As a method for calculating degree of similarity between character string and documents, there is also a method called BM25 (non-patent document 2). However, in this method, similarly to TFIDF, the degree of similarity is calculated without considering occurrence position information of each word in the document when the character string includes a plurality of words.

In addition, there is also a method, for English, for calculating the degree of similarity by considering that, when a plurality of words are input, the plurality of words appear in proximity to each other (refer to non-patent document 3, for example).

[Non-patent document 1] Gerard Salton and Chris Buckley, Term Weighting Approaches in Automatic Text Retrieval, Information Processing and Management: an International Journal, Pages: 513-523 Vol. 24, Issue 5, 1988.

[Non-patent document 2] Stephen E. Robertson, Steve Walker, Micheline Hancock-Beaulieu, Asrron Gull, and Marianna Lau. Okapi at TREC3. In text Retrieval Conference, pages 21-30, 1992.

[Non-patent document 3] Tao Tao and ChengXiang Zhai. An exploration of proximity measures in information retrieval. In SIGIR '07: Proceedings of the 30$^{th}$ annual international ACM SIGIR conference on Research and development in information retrieval, pp. 295-302. New York, N.Y., USA, 2007. ACM Press.

DISCLOSURE OF THE INVENTION

Problem to be Solved by the Invention

As mentioned above, in the word index (inverted index) having word-based position information, there is a problem in that the amount of position information is large and that large processing cost is required for adjacency processing.

As to the similarity calculation methods described in the non-patent document 1 and the non-patent document 2, even when the input character string contains a plurality of words (or morphemes), similarity calculation is performed irrespective of occurrence position of the input character string. Thus, there is a problem in that accuracy of the information search apparatus is low.

In addition, in the similarity calculation method proposed in the non-patent document 3, when a plurality of words are input, similarity is calculated considering (proximity) that the plurality of words appears in proximity to each other, but, it is not considered that a word is composed of a plurality of morphemes.

The present invention is contrived in view of the above points, and an object of the present invention is to provide an information search method, apparatus, program and computer readable recording medium that can enhance search accuracy and realize calculation cost reduction by providing word index for solving the conventional problem and by performing calculation of the degree of similarity using proximity information on the whole document.

Means for Solving the Problem

In order to solve the above-mentioned problem, the present invention is configured as an information search apparatus including:

a character string input unit configured to obtain a character string from a client;

a character string information search unit configured to obtain information that includes the character string from an index DB;

a similarity calculation unit configured to calculate degree of similarity between the character string and searched information; and an output unit configured to output the searched information in descending order of the degree of similarity, wherein the character string information search unit includes a unit configured to, when the input character string contains a plurality of words, search an index DB, based on each word, that stores words and occurrence position information of the words to obtain a distance between occurrence positions of the words, and the similarity calculation unit includes a unit configured to calculate the degree of similarity based on the distance between occurrence positions of the words.

The present invention can be also configured as an information search apparatus including:

a character string input unit configured to obtain a character string from a client;

a character string information search unit configured to obtain information on a document including the character string from an index DB that stores sentence-based word occurrence position information in the document for each word;

a similarity calculation unit configured to calculate degree of similarity between the character string and the document; and an output unit configured to output information of the document in descending order of the degree of similarity, wherein the character string information search unit includes a unit configured to, when the input character string includes a plurality of words, search the index DB based on each word to obtain sentence-based occurrence position information of each word for each document, and the similarity calculation unit includes a unit configured to calculate the degree of similarity between each document and the character string based on degree of sentence-based co-occurrence of the plurality of words in each document.

In the information search apparatus, the similarity calculation unit may obtain, for a document, the number of sentences in which the plurality words co-occur as the degree of the co-occurrence in the document.

In addition, the present invention can be also configured as an information search method as a processing method executed by the information search apparatus. In addition, the present invention can be configured as an information search program for causing a computer to function as each unit included in the information search apparatus, and can be configured as a computer readable recording medium that stores the information search program.

Effect of the Invention

As mentioned above, according to the present invention, when search is requested by using two or more words (or one word comprised of two or more morphemes) as a query, word occurrence position information is used, so that the degree of similarity can be calculated in consideration of proximity of the two words or in consideration of co-occurrence of the two words in a sentence. Accordingly, there is a possibility that search accuracy can be improved. In addition, the degree of similarity can be calculated at low cost by storing the occurrence position using bits and by realizing processing only by using bit calculation.

In addition, by calculating the degree of similarity based on the degree of proximity (distance) of words or the degree of co-occurrence of words instead of performing adjacency processing, processing cost can be reduced compared to conventional technique in which adjacency processing is performed. In addition, recall ratio can be improved compared to the conventional technique. In addition, by configuring the character string index using the sentence-based position information as the separated sections instead of word-based position information, information amount can be reduced compared to the conventional word index in which word-based position information is used.

DESCRIPTION OF REFERENCE SIGNS

Figure 1:
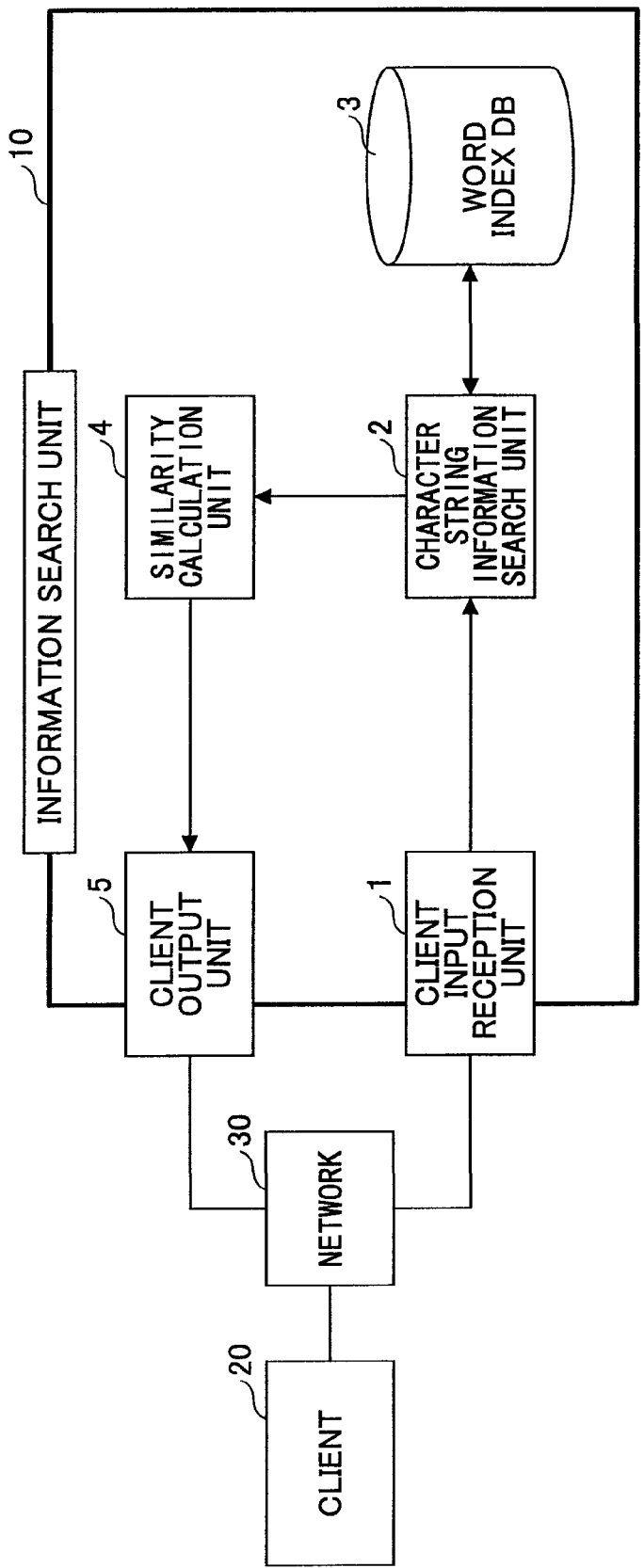
FIG. 1 is a block diagram of an information search system.
Figure 2:
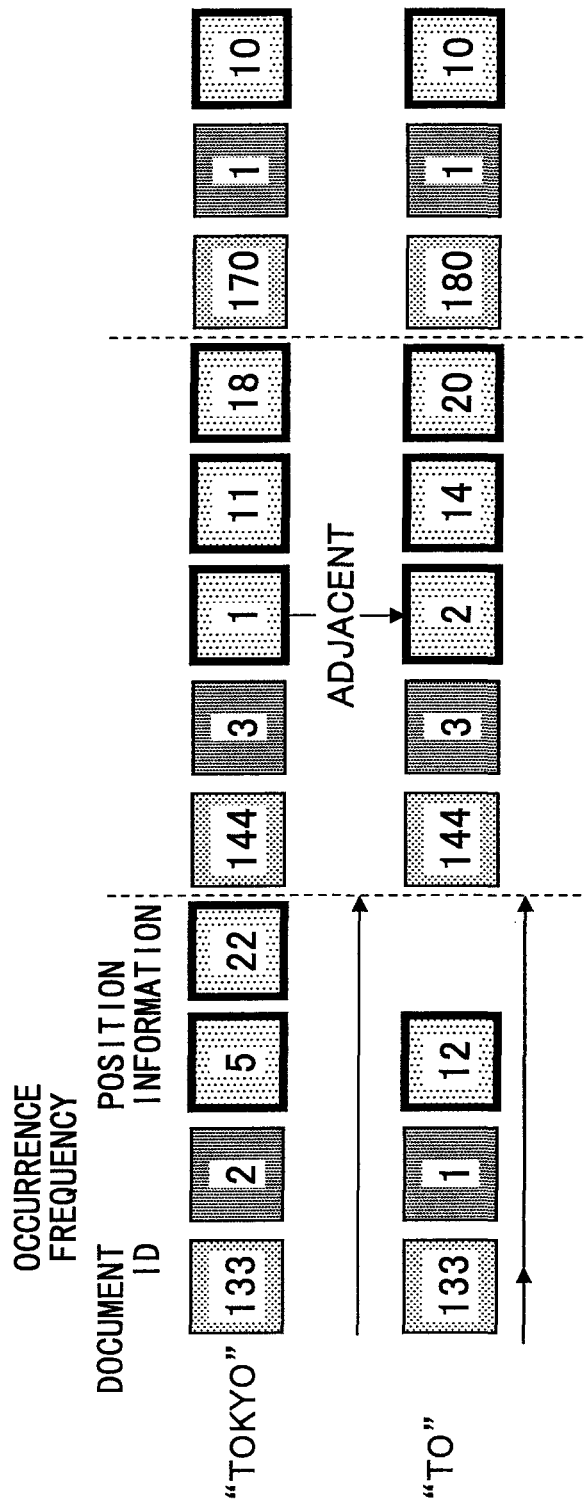
FIG. 2 is a diagram showing an example of information obtained from a conventional word index DB.
Figure 3:
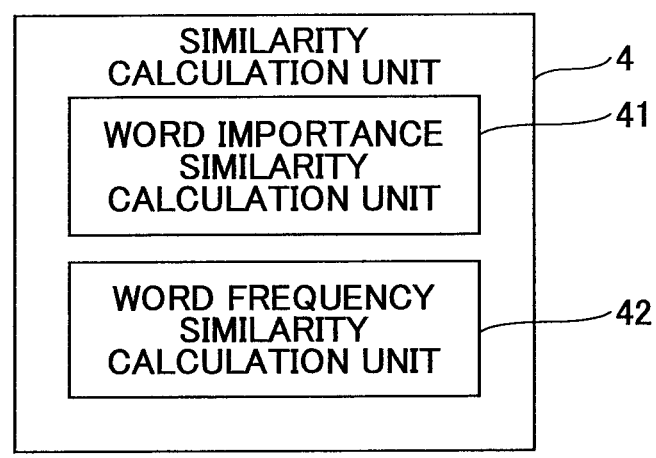
FIG. 3 is a diagram showing a similarity calculation unit 4.

1 client input reception unit, character string input means
2 character string search unit, character string information search means
3, 3' word index DB
4, 4' similarity calculation unit, similarity calculation means
5 client output unit, output means
6 character string selection unit
10 information search apparatus
12 proximity unconsidered word list storing unit
14 document storing DB
20 client
30 network
41 word importance similarity calculation unit
42 word frequency similarity calculation unit
43 word position similarity calculation unit

PREFERRED EMBODIMENTS FOR CARRYING OUT THE INVENTION

In the following, embodiments of the present invention are described with reference to figures. First, an outline example of the embodiment of the present invention is described with reference to FIGS. 4 and 5.

Figure 4:
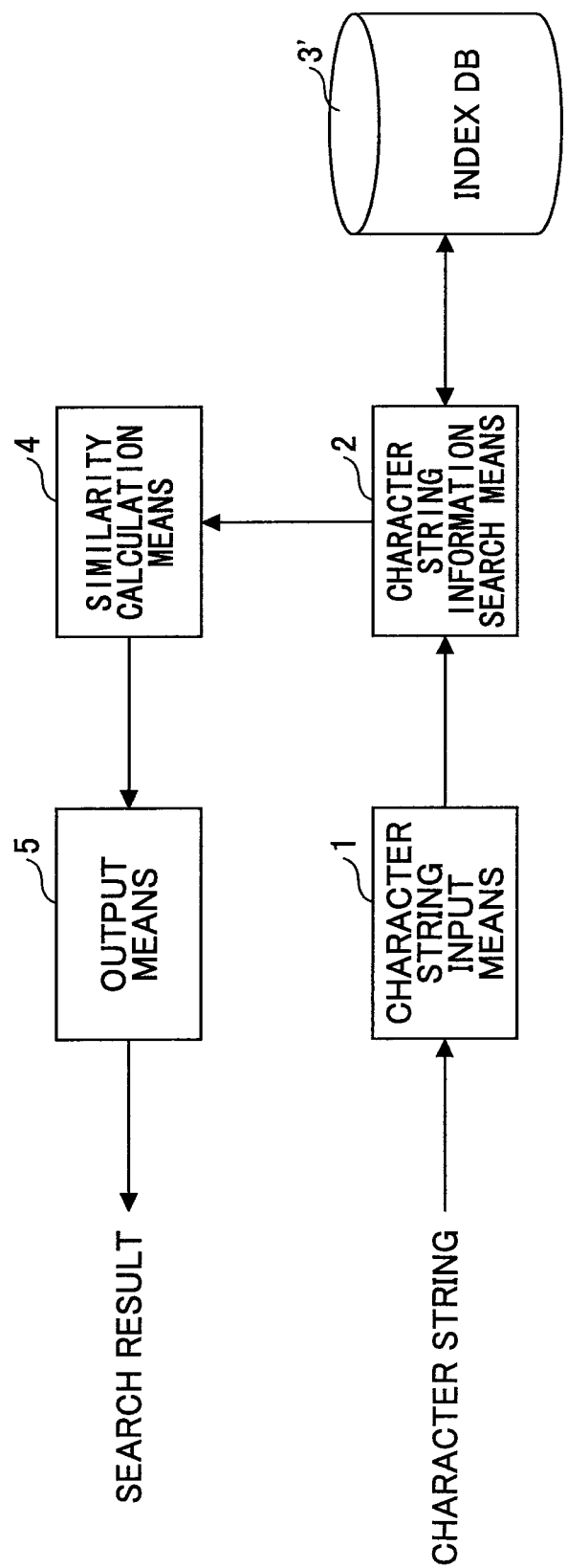
FIG. 4 is a diagram showing a schematic configuration example of the information search apparatus of an embodiment of the present invention.

FIG. 4 is a diagram showing a schematic configuration example of the information search apparatus of the present embodiment. As shown in FIG. 4, the information search apparatus includes: character string input means 1 configured to obtain a character string from a client; character string information search means 2 configured to obtain information that includes the character string from a DB; similarity calculation means 4 configured to calculate degree of similarity between the character string and searched information; and output means 5 configured to output the searched information in descending order of the degree of similarity, wherein the character string information search means 2 includes means configured to, when the input character string contains a plurality of words, search an index DB 3', based on each word, that stores words and occurrence position information of the words to obtain a distance between occurrence positions of the words, and the similarity calculation means 4 includes means configured to calculate the degree of similarity based on the distance between occurrence positions of the words.

The index DB 3' may hold the word and information in which occurrence position information of the word in the document is aggregated in units of sentences, and the occurrence position information may be represented as a bit sequence, and the character string information search means may include means configured to search the index DB 3 to obtain the occurrence position of the word as the bit sequence, and the similarity calculation unit may include means configured to obtain the degree of similarity by performing logical calculation of bits using the bit sequence of the occurrence position information of the index DB 3'.

When the input character string is composed of a plurality of words, the information search apparatus may further include character string selection means configured to refer to proximity unconsidered word list storing means that stores words for which proximity is not considered, and to determine that the word is one for which proximity is not considered when the word exists in the proximity unconsidered word list storing means, and the character string information search means 2 may include means configured to search the index DB 3 assuming that the word exists in every sentence as to the word determined to be one for which proximity is not considered by the character string selection means.

In the information search apparatus, when the index DB 3 stores sentence-based occurrence position information as sentence numbers, the character string information search means 2 may further include adjacency check means configured to search the index DB 3 based on a plurality of words obtained from the input character string, and search a document storing DB storing documents based on an obtained sentence number, and, output the search result to the similarity calculation means only when the sentence includes the input character string.

Figure 5:
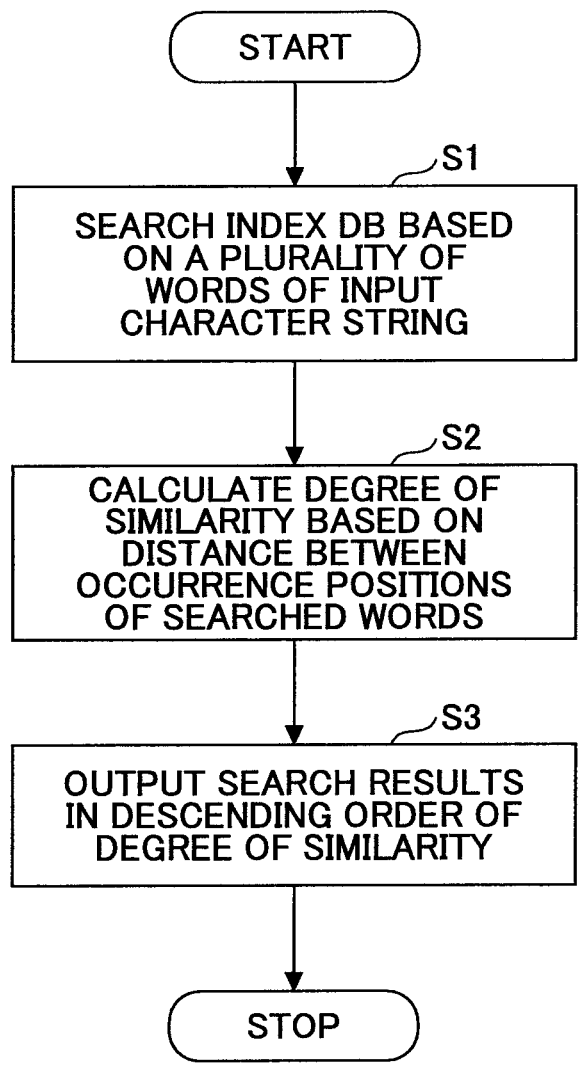
FIG. 5 is a diagram for explaining outline of an information search method of an embodiment of the present invention.

FIG. 5 is a diagram for explaining outline of the information search method of an embodiment of the present invention. The information search method is an information search method in an apparatus for obtaining a character string from a client, obtaining information that includes the character string from a DB, calculating degree of similarity between the character string and searched information, and outputting the searched information in descending order of the degree of similarity (step 3), the information search method including: a character string information search step (step 1) in which, when the input character string contains a plurality of words, character string information search means searches an index DB, based on each word, that stores words and occurrence position information of the words to obtain a distance between occurrence positions of the words, and a step (step 2) in which similarity calculation means calculates the degree of similarity based on the distance between occurrence positions of the words.

In the information search method, when the index DB holds the word and information in which occurrence position information of the word in the document is aggregated in units of sentences, and when the occurrence position information is represented as a bit sequence, in the character string information search step, the apparatus searches the index DB to obtain the occurrence position information of the word as the bit sequence, and in the similarity calculation step, the apparatus obtains the degree of similarity by performing logical calculation of bits using the bit sequence of the occurrence position information of the index DB.

The information search method may further include: a character string selection step for, when the input character string is composed of a plurality of words, referring to proximity unconsidered word list storing means that stores words for which proximity is not considered to determine that the word is one for which proximity is not considered when the word exists in the proximity unconsidered word list storing means, and wherein, in the character string information search step, the apparatus may search the index DB assuming that the word exists in every sentence as to the word determined to be one for which proximity is not considered in the character string selection step.

In the character string information search step of the information search method, when the index DB stores sentence-based occurrence position information as sentence numbers, the apparatus may search the index DB based on a plurality of words obtained from the input character string, and search a document storing DB storing documents based on an obtained sentence number, and, output the search result to the similarity calculation means only when the sentence includes the input character string.

In the present embodiment, an information search program for causing a computer to function as each unit forming the information search apparatus can be provided. Also, a computer readable recording medium that stores the information search program can be provided.

In the following, each embodiment of the present invention is described in detail.

In the embodiment of the present invention, it is assumed that an information search program-operating in a Web server on the Internet is stored in a recording medium such as a hard disk, and is executed in the Web server. Thus, the client side accesses the information search apparatus by using a Web browser and the like via the network, and searches information via the client input reception unit and the output unit. This method can be also applied to a stand alone system.

Figure 6:
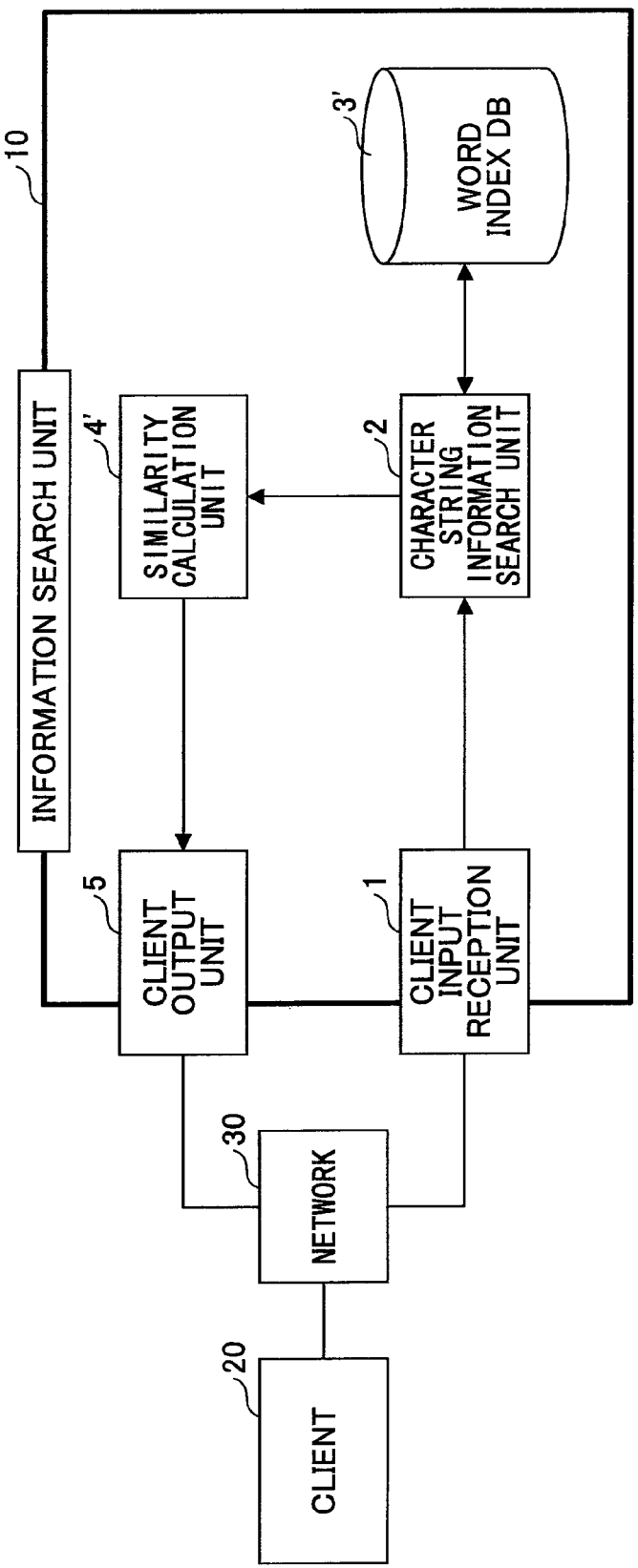
FIG. 6 is a block diagram of a system of an embodiment of the present invention.

FIG. 6 shows a system configuration of the embodiment of the present invention. As shown in FIG. 6, the system of the embodiment of the present invention includes a client 20, a network 30, and an information search apparatus 10. The information search apparatus 10 includes a client input reception unit 1, a character string information search unit 2, a word index DB 3', a similarity calculation unit 4', and a client output unit 5. The configuration is almost similar to the before-mentioned one of FIG. 1. But, the configurations of the word index DB 3' and the similarity calculation unit 4' are different from those of the word index DB 3 and the similarity calculation unit 4 shown in FIG. 1.

In the configuration shown in FIG. 6, in the information search apparatus 10, a character string is input to the client input reception unit 1 from the client 20 via the network 30. The character string is transferred from the client input reception unit 1 to the character string information search unit 2, so that the character string is divided into each word. The character string information search unit 2 obtains, from the word index DB 3', documents including the divided word and occurrence positions of the word in the documents, and transfers these to the similarity calculation unit 4'. The similarity calculation unit 4' calculates the degree of similarity between the character string and each document based on the obtained word and occurrence position of the word. By the way, function allocation in the configuration shown in FIG. 6 is not limited to that described in the following. For example, the character string information search unit 2 may perform a part of processing (such as calculation of degree of proximity, calculation of degree of co-occurrence) in the similarity calculation unit 4'.

When the transferred character string is a single word, the similarity calculation unit 4' calculates the degree of similarity between the word and documents where the word occurs by using the method of the before-mentioned non-patent document 1, for example, and outputs document IDs in descending order of the degree of similarity. By the way, by searching another DB based on the document IDs, documents may be output. When the word is formed by a plurality of words, the similarity calculation unit 4' calculates the degree of similarity between the character string and the documents considering how much the plurality of words are in proximity to each other, and then, as a result, the similarity calculation unit 4' transfers document IDs and the like to the client output unit 5 in descending order of the degree of similarity.

Figure 7:
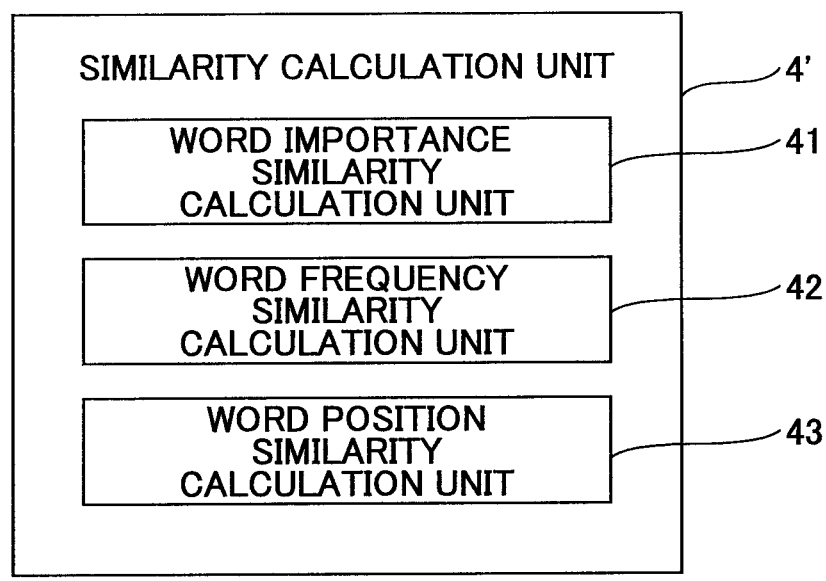
FIG. 7 is a block diagram of the similarity calculation unit 4' of the first embodiment of the present invention.

FIG. 7 shows a configuration of the similarity calculation unit 4' of the first embodiment of the present invention.

In the similarity calculation unit 4' shown in the figure, compared to the conventional technique, a word position similarity calculation unit 43 is added to the word importance similarity calculation unit 41 and the word frequency similarity calculation unit 42. The word position similarity calculation unit 43 calculates degree of similarity by using proximity information or co-occurrence information.

Next, a series of processes of the embodiment of the present invention is described.

Figure 8:
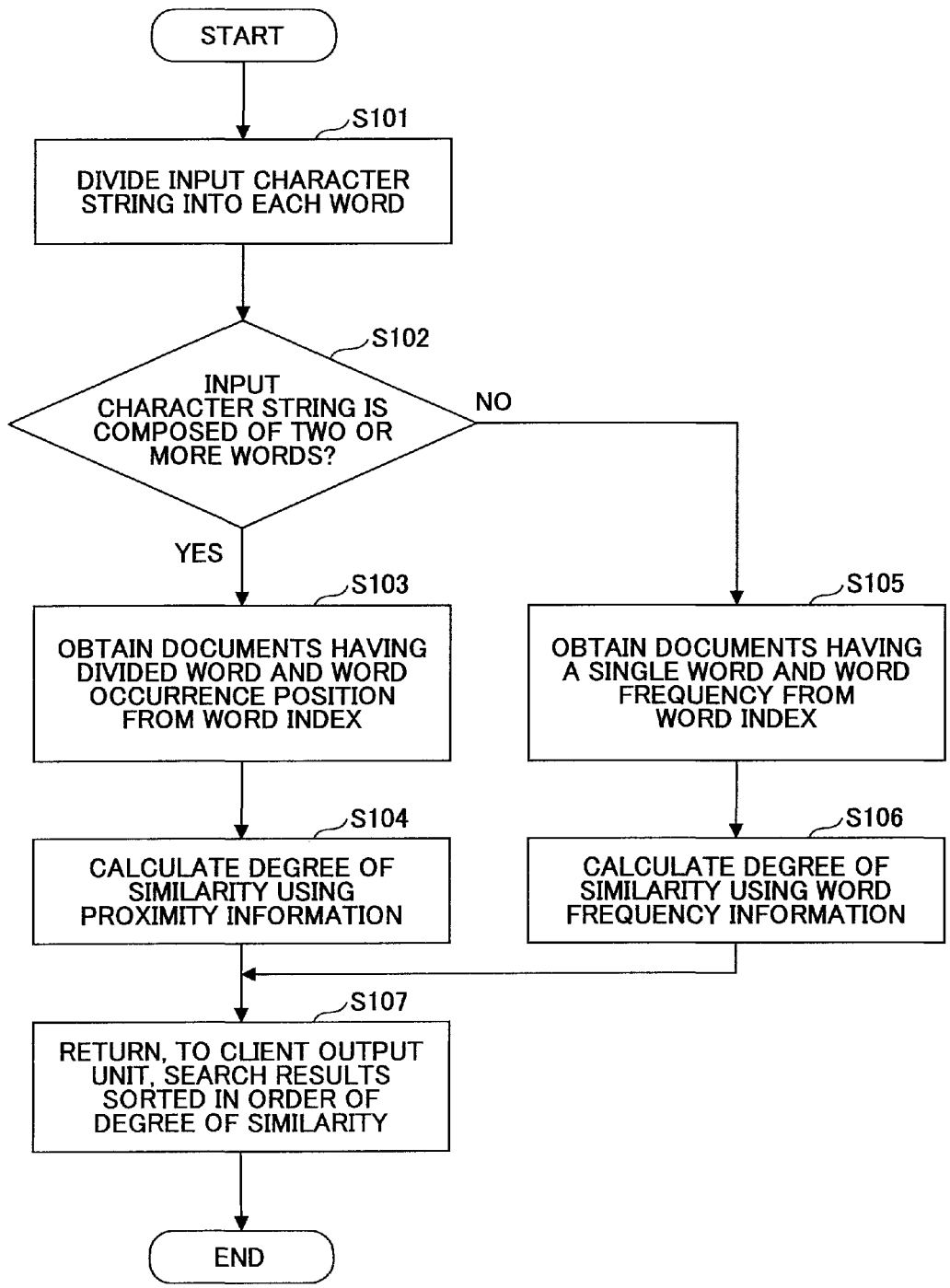
FIG. 8 is a flowchart of a series of operation of the information processing apparatus 10 in the first embodiment of the present invention.

FIG. 8 shows a flowchart of the series of operation of the information processing apparatus 10 in the first embodiment of the present invention.

Step 101) When a character string is input from the client input reception unit 1, the character string information search unit 2 divides the input character string into each word. For example, when a character string of "Tokyo-To" is input, the character string information search unit 2 divides it into each word using morphological analysis processing. By dividing into each word, the word is divided into character strings of "Tokyo" and "To" in general.

Step 102) The character string information search unit 2 checks whether the character string is composed of two or more words. When it is composed of two or more words, the process goes to step 103. If it is a single word, the process goes to step 105.

Step 103) For each divided word, the character string information search unit 2 searches the word index DB 3' to obtain documents having the divided word and word occurrence positions.

Step 104) The similarity calculation unit 4' calculates degree of similarity using proximity information, then the process goes to step 107. The method for calculating the degree of similarity by using the proximity information is described later.

Step 105) The similarity calculation unit 4' obtains, from the word index DB 3', documents having the single word which is the input character string and the word occurrence frequency.

Step 106) In the case of the single word, since importance of the word is common to all document, the similarity calculation unit 4' calculates degree of similarity between the word and each document in which the word occurs by using only frequency of the word by the word frequency similarity calculation unit 42.

Step 107) When the input character string contains two or more words in step 102, the similarity calculation unit 4' arranges the search results (document IDs, for example), obtained by using proximity information, in order of degree of similarity (descending order of degree of similarity, for example), and transfers the search results to the client output unit 5. In step 102, when the input character string is a single word, the similarity calculation unit 4' sorts the search results in order of the degree of similarity calculated by using word frequency information, and transfers the search results to the client output unit 5. Accordingly, the client output unit 5 presents the search results to the client 20.

Next, the similarity calculation method using the position proximity information in step 104 is described.

Figure 9:
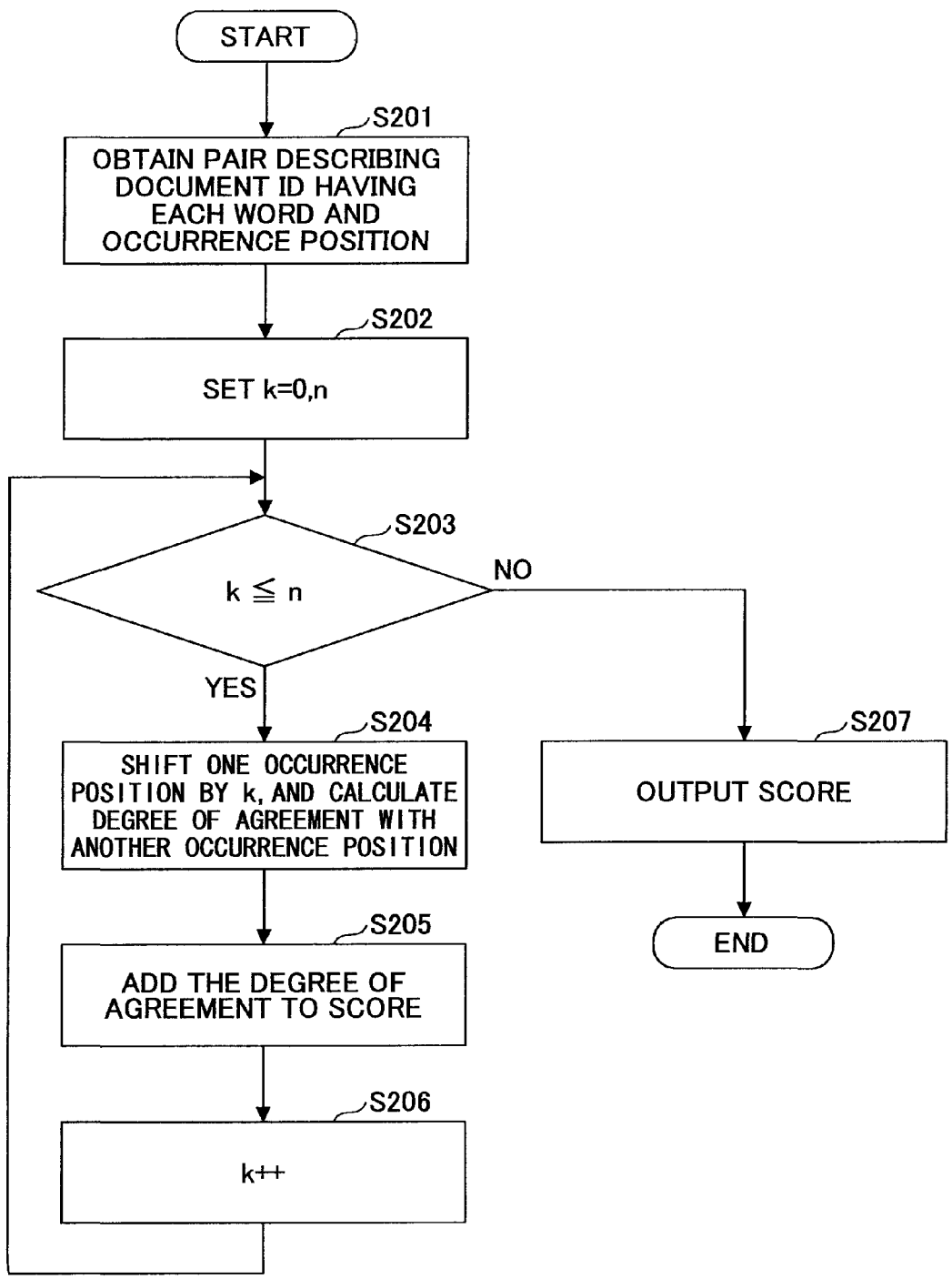
FIG. 9 is a flowchart of similarity calculation processing using position proximity information in the first embodiment of the present invention.

FIG. 9 is a flowchart of similarity calculation processing using position proximity information in the first embodiment of the present invention.

Step 201) The word position similarity calculation unit 43 in the similarity calculation unit 4' obtains document IDs of documents including each word obtained by dividing the character string, and obtains occurrence positions of each word in each document ID. The information can be obtained from information obtained by the character string information search unit 2 from the word index DB 3'.

Figure 10:
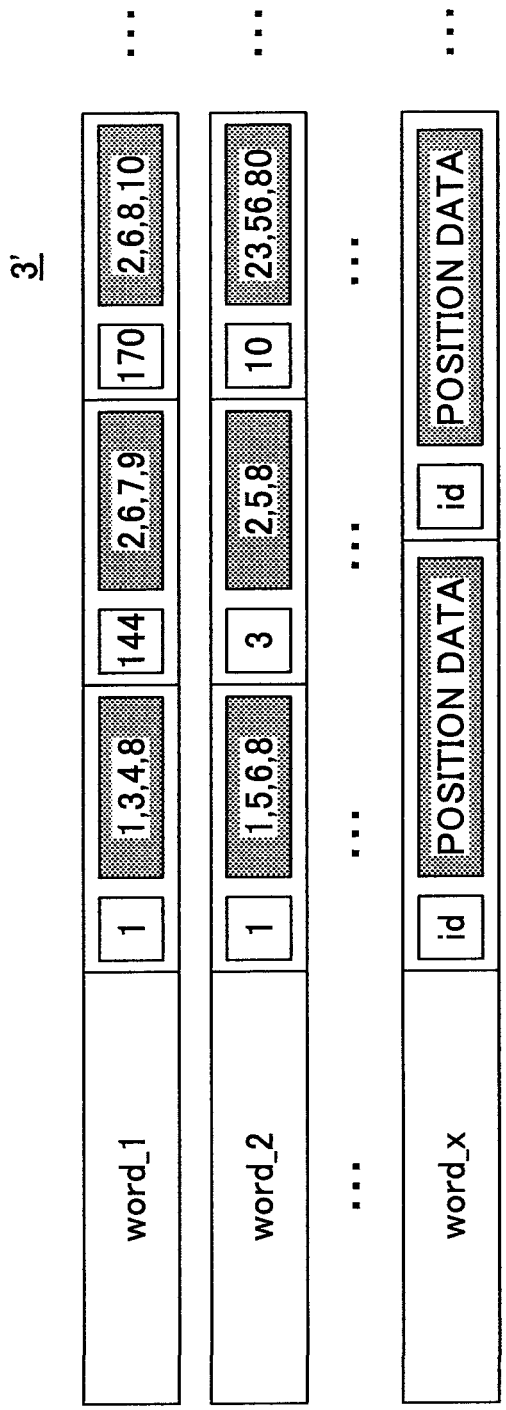
FIG. 10 is a diagram showing an example of the structure of data stored in the word index DB 3' in the first embodiment of the present invention.

FIG. 10 shows an example of the structure of data stored in the word index DB 3' in the present embodiment. In the example shown in FIG. 10, for each word, the word and document IDs in which the word occurs are stored. In addition, for each document ID, occurrence position data of the word is stored. The occurrence position of the word in the present embodiment is sentence-based occurrence position.

Figure 11:
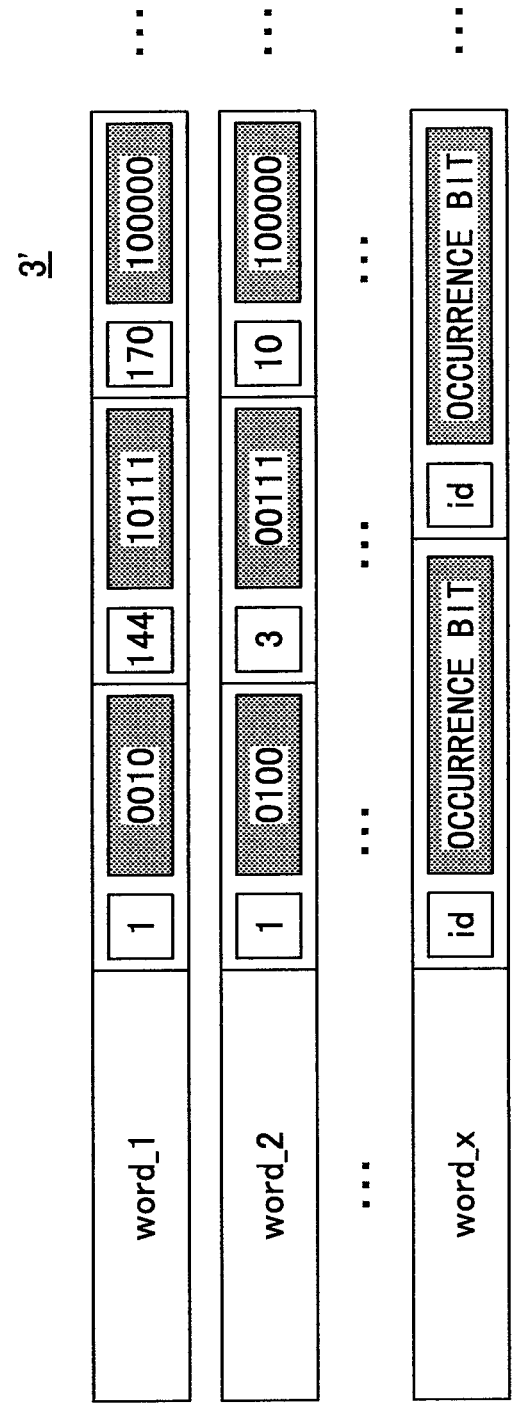
FIG. 11 shows an example for storing position information using bit sequence in the word index DB 3' in the first embodiment of the present invention.

For example, when word1 is a character string of "Tokyo", FIG. 10 shows that, "Tokyo" exists in a document of id1, and the occurrence positions are a first sentence, a third sentence, a fourth sentence and an eighth sentence. FIG. 11 shows an example in which the structure is represented as bitmap information. In FIG. 10, the sentence-based occurrence positions are indicated by numbers. On the other hand, in FIG. 11, they are represented by bitmap. For example, "0010" on the document id1 for word1 represents that the word word1 exists in the third sentence. Although, in the embodiment of the present invention, the position information of words is represented based on sentence, the present invention is not limited to this method, and it is only necessary that position information is represented in units of divided sections. For example, even if the position information is changed to word-based occurrence position, paragraph-based occurrence position, and the like, the similarity calculation processing based on proximity can be performed similarly.

When the words obtained by dividing the input character string are "Tokyo" and "To", the word position similarity calculation unit 43, in the process of step 201, obtains a document ID of a document including both of "Tokyo" and "To", sentence-based occurrence position of "Tokyo" in the document, and obtains sentence-based occurrence position of "To" in the document. For example, in the example of FIG. 10, when word1 is "Tokyo" and word2 is "To", in step 201, the word position similarity calculation unit 43 obtains, for "Tokyo", a document ID1, occurrence positions (first sentence, third sentence, fourth sentence, and eighth sentence) in the document, and, obtains, for "To", the document ID1, and occurrence positions (first sentence, fifth sentence, sixth sentence and eighth sentence) in the document.

In this example, in the following, the word position similarity calculation unit 43 performs processing for calculating a score indicating how much the sentence-based occurrence position of "Tokyo" and the sentence-based occurrence position of "To" are in proximity to each other in the document of document ID1, and setting the score to be the degree of similarity between the input character string ("Tokyo-To") and the document of document ID1.

Step 202) The word position similarity calculation unit 43 sets counter k=0 and n, wherein "n" indicates the number of sentences by which proximity is checked backward and forward. For example, when n=1, the proximity similarity is obtained only by checking adjacent sentences. On the other hand, when a document includes m sentences and n is set to be m, proximity similarity in the whole document can be calculated.

Step 203) The word position similarity calculation unit 43 checks whether the value of k is equal to or less than n. When k is equal to or less than n, the process goes to step 204, and when k is greater than n, the process goes to step 207.

Steps 204-205) The word position similarity calculation unit 43 shifts one occurrence position in the pair of the occurrence position groups obtained in step 201 by k (by subtracting k, for example), and calculates degree of agreement score (Q,d,k) between the shifted occurrence position and another occurrence position. The degree of agreement score(Q,d,k) can be calculated by the following equation, for example.

$$\text{score}(Q, d, k) \sum_{q_i \in Q} \sum_{q_j \in (Q-q_i)} \frac{1}{\alpha k + 1} \text{count}(Pos_d(q_i), Pos_{d_k}(q_j))$$

In the above equation, Q indicates query set (set of words obtained by dividing the character string), d indicates document, $Pos_d(q_i)$ indicates occurrence position of $q_i$ (word, "Tokyo" in the above-mentioned example, for example) in the document d, and $Pos_{dk}(q_j)$ indicates a sequence obtained by subtracting k from occurrence positions of $q_j$ (word, "To" in the above-mentioned example, for example) in the document d. For example, in the example in which word2 is "To" as shown in FIG. 10, when k is 0, $Pos_{dk}(q_j)$ is (1, 5, 6, 8). Also, in this example, when k is 1, $Pos_{dk}(q_3)$ is (0, 4, 5, 7).

Count (Pos,Pos) is a function for receiving two position data and returning the degree of agreement. For example, when k=0, the Count (Pos,Pos) outputs a total sum of the number of times where a word $q_i$ and a word $q_j$ which is different from $q_i$ occur in a same sentence. When k=1, Count (Pos,Pos) outputs a total sum of the number of times where the word $q_i$ and the word $q_j$ occur in adjacent sentences.

For example, when the word $q_i$ is "Tokyo" in the above example, and the word $q_j$ other than $q_i$ is "To" in the above example, if k=0, $Pos_d(q_i)$ is (1, 3, 4, 8) and $Pos_{dk}(q_i)$ is (1, 5, 6, 8). Thus, Count returns 2. That is, this indicates that the number of times where "Tokyo" and "To" occur in a same sentence is 2 (sentence 1 and sentence 8) in the subject document.

In the equation, a is a coefficient, and is 1, for example. By using 1/(αk+1), the nearer the positions of sentences with each other in which each word exists, the larger the calculated score becomes.

Step 206) The word position similarity calculation unit 43 increments k by 1, and the process returns to step 203.

Step 207) The word position similarity calculation unit 43 outputs a total sum of values of score calculated in each value of k as the degree of similarity between the input character string and the document. This is the degree of similarity considering the position information of word. More particularly, that is a degree of similarity considering degree of proximity. That is calculated by the following equation.

$$sim(Q, d) = \sum_{w \in q} \text{score}(Q, d, k)$$

Figure 12:
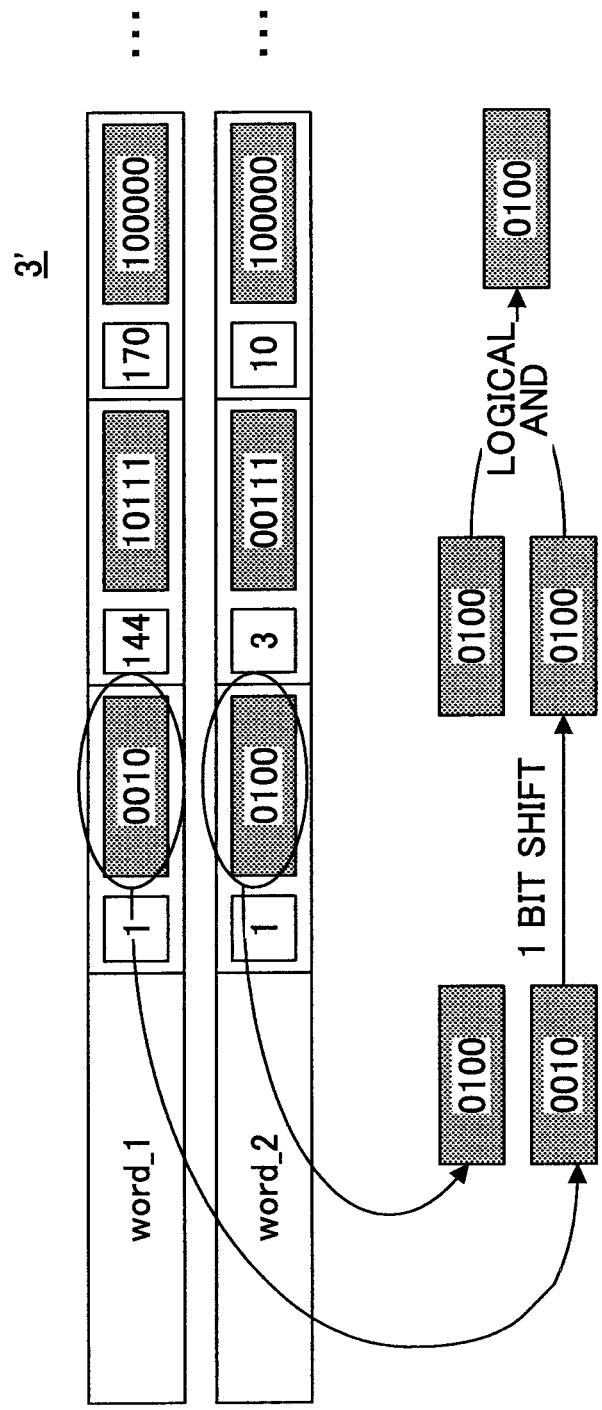
FIG. 12 is a diagram for explaining proximity calculation in the case when using position information that uses the bitmap.

In the case when using position information that uses the bitmap shown in FIG. 11, "count" can be calculated only by calculating logical AND between $Pos_d$ and information obtained by shifting $Pos_{dk}$ by k bits, and by counting the number of 1 in the bits of the result of the logical AND. FIG. 12 is a diagram for explaining proximity calculation in the case when using position information that uses the bitmap, and indicates a score calculation example when Q(word_2, word_1), d=1 and k=1 are input. First, the character string information search unit 2 obtains position information of word1 and word2 from the word index DB 3' (configuration shown in FIG. 11). Based on the obtained position information, the similarity calculation unit 4' shifts position information of word 1 by 1 bit, and calculates logical AND between the shifted position information and position information of word_2. The bit position of the result of logical AND indicates a position where word1 and word2 exist in adjacent sentences. In this case, since the positive bit is only one which is the second bit, the score is "1". As a method for counting the number of is from the bit sequence, there is a method for obtaining it at high speed using SSE4 instruction POPCNT of Intel CPU, for example.

Next, another example of the method for calculating the degree of similarity between the character string that is the query and the document is described. In this example, the degree of similarity (score) is calculated using the following equation.

$$\text{score}(Q, d) = \sum_{q \in Q} w_d(q) \tag{1}$$

$$q = T_q = (t_1, t_2 \ldots t) \tag{2}$$

$$w_d(q) = \sum_{t \in T_q} w_d(t) \tag{3}$$

$$w_d(t) = \frac{(k_1 + 1) \times coocc(T_q, d)}{K + coocc(T_q, d)} \times \log\left(\frac{|N| - df(t) + 0.5}{df(t) + 0.5}\right) \tag{4}$$

The equation (1) indicates that the similarity score between the set Q of the character string (query) q and the document d is the sum of similarity $w_d(q)$ for each query. The equation (2) indicates that the query q is comprised of a set $T_q$ of morpheme t. The equation (3) indicates that the similarity $w_d(q)$ is the sum of similarity $w_d(t)$ for each morpheme. The similarity $w_d(t)$ can be obtained from equation (4).

The equation (4) corresponds to an equation in which tf(t, d) (occurrence frequency of morpheme t in the document d) is replaced with coocc($T_q$,d) in the following equation which is used in BM25 shown in non-patent document 2.

$$w_d(t) = \frac{(k_1 + 1) \times tf(t, d)}{K + tf(t, d)} \times \log\left(\frac{|N| - df(t) + 0.5}{df(t) + 0.5}\right)$$

Other parameters are similar to those in BM25. N indicates the number of the whole documents, df(t) indicates the number of documents including t, and $k_1$ indicates a coefficient. K is a value obtained from $k_1$ and document length and the like.

In the equation, coocc($T_q$,d) indicates the number of times of sentence-based co-occurrence of $T_q$ in the document d. For example, when $T_q$ is "Tokyo" and "To", the similarity calculation unit 4' obtains information shown in FIG. 13 as document ID, occurrence frequency and sentence-based position information for each word from the word index DB3' or from the character string information search unit 2 when calculating similarity. In this example, the word index DB3' includes occurrence frequency of words in addition to document ID, and sentence-based word occurrence position information. As to the occurrence frequency, if the word exists in a sentence, one is added even if the word exits in the same sentence more than one time.

Figure 13:
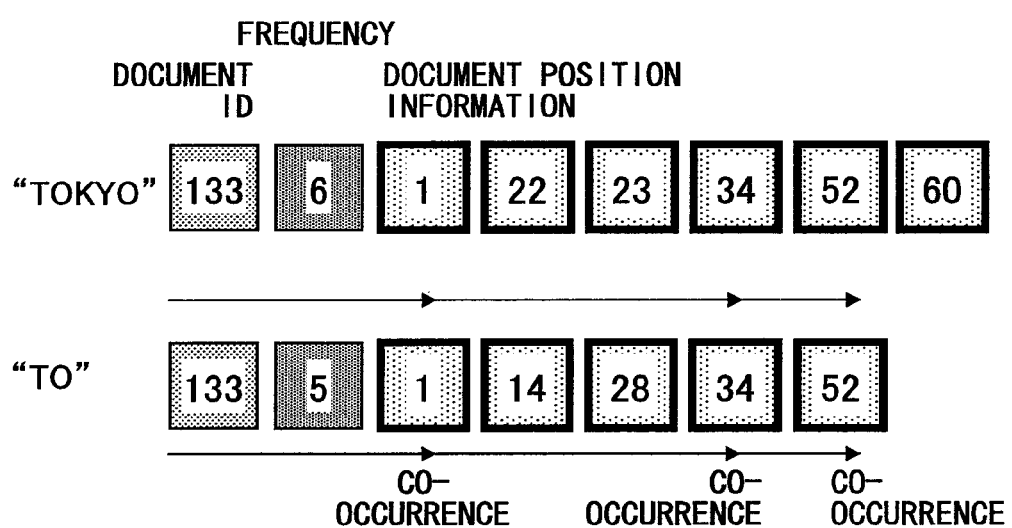
FIG. 13 is a diagram for explaining the number of times of sentence-based co-occurrence.

The similarity calculation unit 4' that obtains the information shown in FIG. 13 detects co-occurrence of "Tokyo" and "To" in sentence 1, sentence 34 and sentence 52 based on the sentence-based position information, and coocc($T_q$,d) (in this case, $T_q$ is "Tokyo" and "To" and d is 133) is set to be 3. Then, the degree of similarity of "Tokyo-To" for the document 133 can be obtained by using the equations (4) and (3).

By the way, in the above-mentioned example, although the degree of similarity is calculated by using the equation in which a part of equation of BM25 is replaced with the number of times of sentence-based co-occurrence coocc($T_q$,d), it is not essential to use an equation based on the equation of BM25. As long as the number of times of sentence-based co-occurrence coocc($T_q$,d) is used, other equation can be used. In addition, for example, it can be considered that the number of times of sentence-based co-occurrence coocc($T_q$, d) itself can be used as degree of similarity.

As mentioned above, in the present embodiment, the degree of similarity is calculated using degree of proximity of words or using degree of co-occurrence of words in units of separated sections (sentence-based in the above example), without performing adjacency processing. Therefore, processing cost can be reduced compared to the conventional technique in which adjacency processing is performed. In addition, recall ratio can be improved compared to the conventional technique. In addition, by configuring the word index DB3' using sentence-based position information instead of word-based position information as the separated section, information amount can be reduced compared to the conventional word index DB that uses word-based position information.

Second Embodiment

In the above-described method, when the input character string includes equal to or more than two words (morphemes), the degree of similarity is calculated using proximity. However, it cannot be necessarily said that proximity leads to improvement of accuracy. For example, when a character string of "restaurant-name telephone-number" is input as a query, it does not necessary mean that "restaurant-name telephone-number" is searched, and there is a possibility that it is only necessary to present a page of a restaurant in which a character string "telephone-number" exits. In the present embodiment, it is determined whether proximity should be considered for the input word input as the query.

Figure 14:
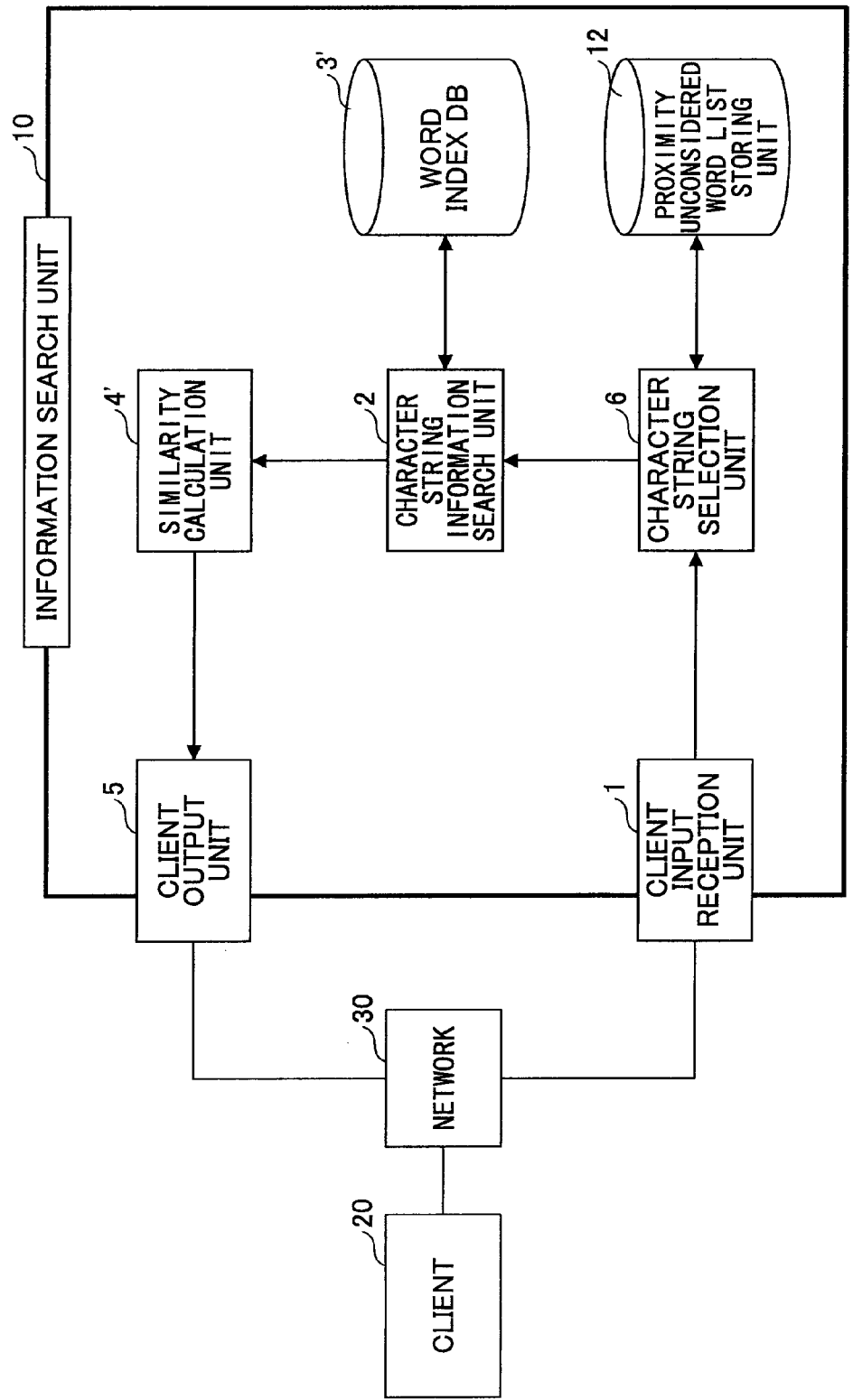
FIG. 14 is a block diagram of the information search apparatus 10 in the second embodiment of the present invention.

FIG. 14 shows a configuration of the information search apparatus 10 in the second embodiment of the present invention. In the figure, parts that are the same as those shown in FIG. 6 are provided with the same symbols, and the description is not provided.

The information search apparatus 10 shown in the figure is configured such that a character string selection unit 6 and a proximity unconsidered word list storing unit 12 are added to the information search apparatus 10 shown in FIG. 6. The proximity unconsidered word list storing unit 12 registers words for which proximity is not considered.

Figure 15:
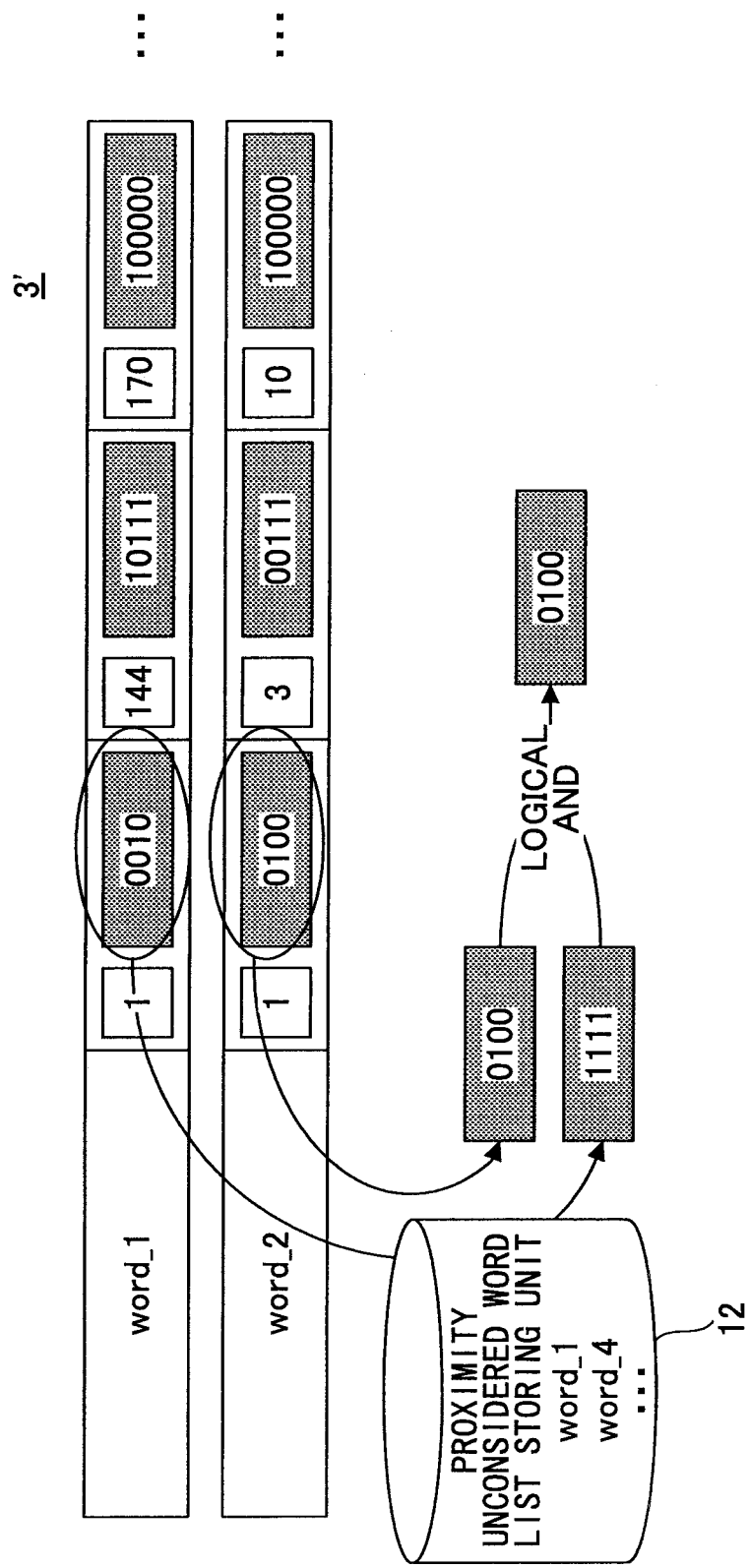
FIG. 15 is a diagram showing a case when a word for which proximity is not considered is input in the second embodiment of the present invention.

The character string selection unit 6 refers to the proximity unconsidered word list storing unit 12 based on the word input as the query, and determines that, if the word exists in the proximity unconsidered word list storing unit 12, the word is a word for which proximity is not considered. When the input word is determined to be a word for which proximity is not considered by the character string selection unit 6, the character string information search unit 2 performs proximity processing assuming that the word exists at every position. FIG. 15 shows a case when a word for which proximity is not considered is input in the second embodiment of the present invention. The word_1 shown in the figure is an example of the word for which proximity is not considered, and the occurrence position is "0010". In the present embodiment, the occurrence positions of the word are converted to "1111" that means the word exists at every sentence, so that the similarity calculation unit 4' performs similarity calculation processing. The processing by the similarity calculation unit 4' is similar to the processing of the before-mentioned first embodiment.

By converting the occurrence positions of the proximity unconsidered word into "1111", the occurrence positions of the word does not contribute to the score of similarity.

Third Embodiment

In the proximity processing in which, when the input character string is composed of two words, only sentence-based occurrence position information is used, since a compound word cannot be identified, there is a fear that search accuracy is deteriorated. Thus, in the present embodiment, a method is described in which adjacency processing for a word comprised of two words is realized when sentence-based word occurrence position information is stored.

Figure 16:
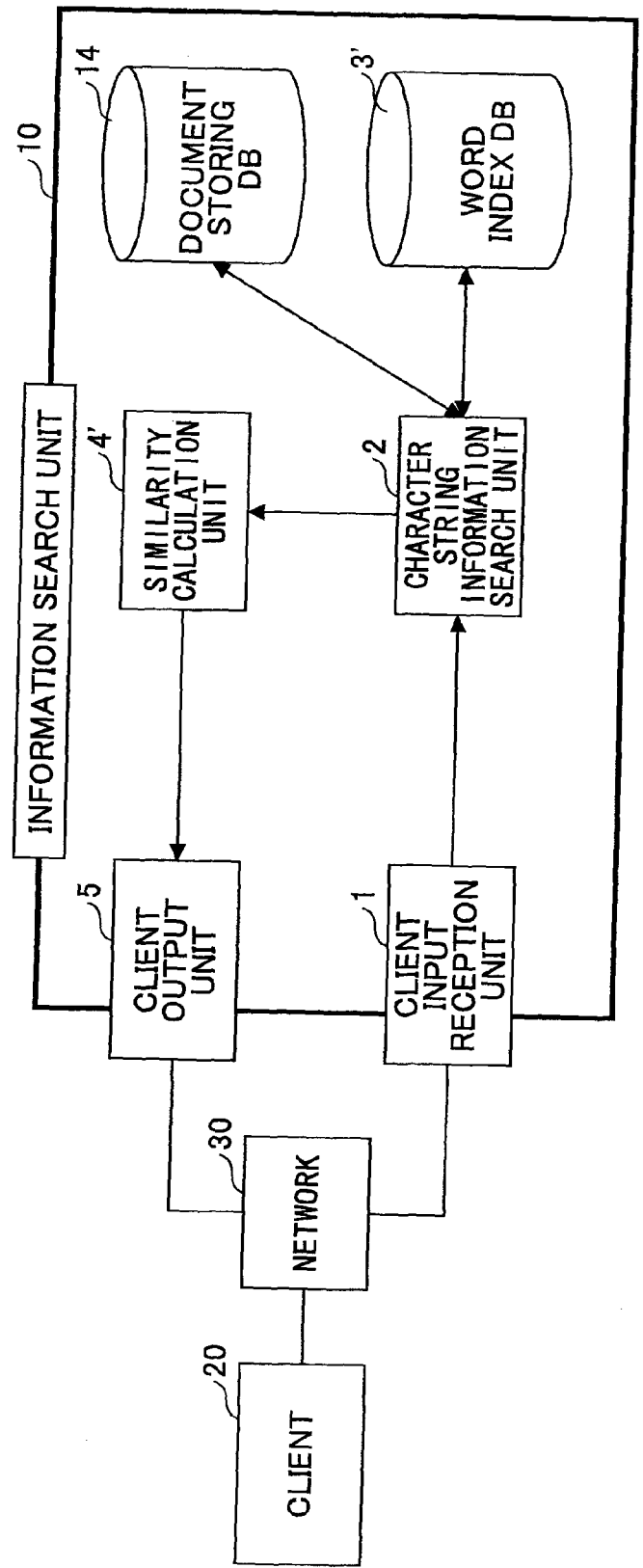
FIG. 16 is a block diagram of the information search apparatus 10 in the third embodiment of the present invention.

FIG. 16 shows a configuration of the information search apparatus 10 in the third embodiment of the present invention.

The information search apparatus shown in the figure has a configuration in which a document storing DB 14 is added to the configuration shown in FIG. 6. In addition, the word index DB 3' stores document ID and sentence-based position information for word, instead of word-based position information.

Figure 17:
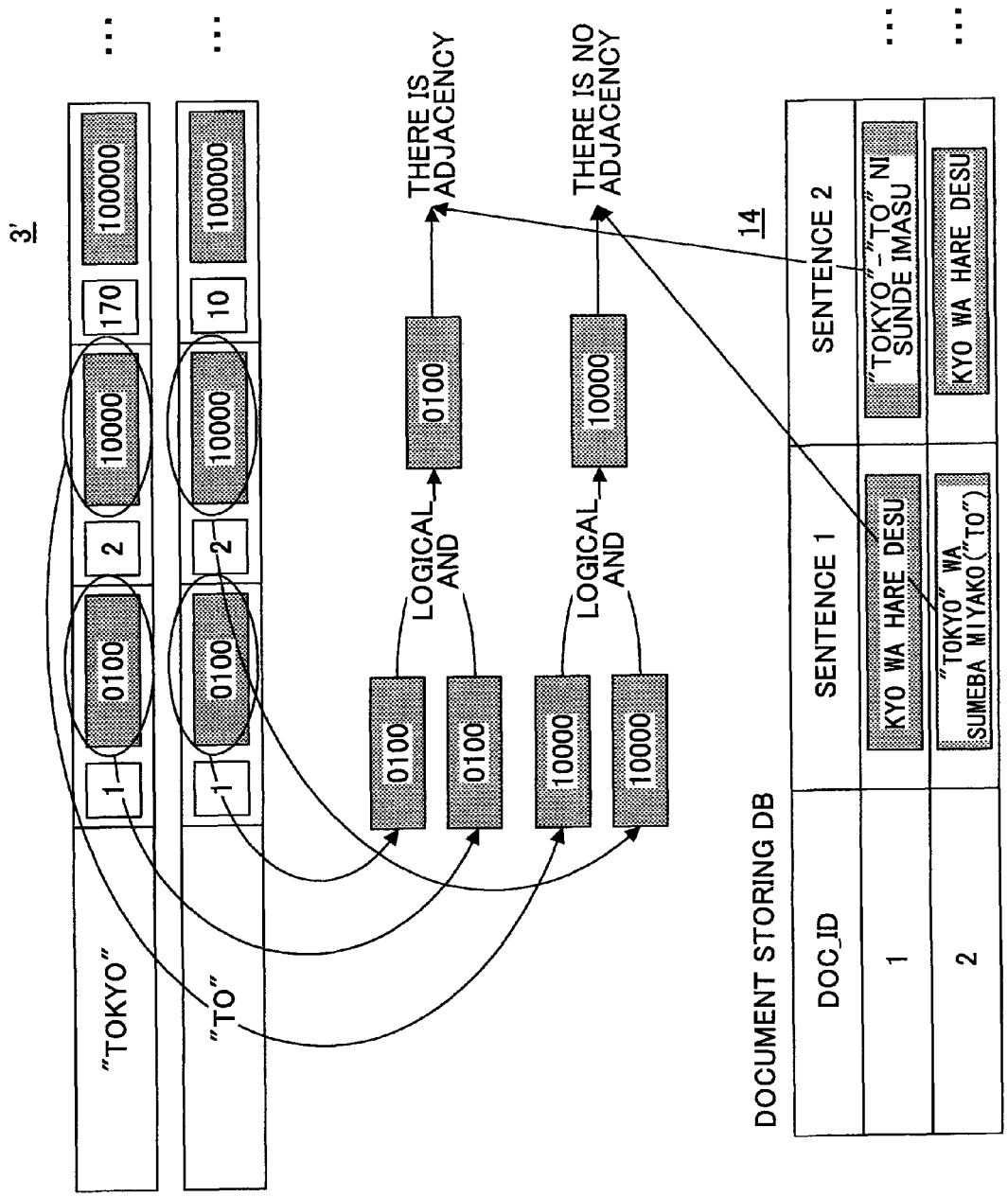
FIG. 17 is a diagram for explaining an adjacency realizing method when sentence-based position information is held in the third embodiment of the present invention.

FIG. 17 is a diagram for explaining an adjacency realizing method when sentence-based position information is held in the third embodiment of the present invention.

As shown in the figure, the word index DB3' stores, for each word, document ID (DOC ID) in which the word exists and sentence-based word occurrence position information represented by bits. Accordingly, the character string information search unit 2 performs morphological analysis on the input character string. Then, when the character string is composed of equal to or more than two words, the character string information search unit 2 obtains document ID having the word and occurrence positions of the word from the word index DB3' so as to check presence or absence of sentence-based co-occurrence by calculating logical AND for the position information.

When there is a sentence in which there is the sentence-based co-occurrence of the word, the character string information search unit 2 searches the document storing DB 14 based on the document ID and the sentence number to obtain the corresponding sentence, and checks whether there is a compound word in which the plurality of words are adjacent with each other in the sentence. When there is the compound word, the character string information search unit 2 can output the document including the compound word as a search result.

In addition, also in this example, similarly to the first embodiment, the word position similarity calculation unit 43 of the similarity calculation unit 4 may calculate degree of similarity based on proximity information (position information) of the document corresponding to the two words obtained from the character string information search unit 2. Also, a score may be added to the document in which the compound word is detected as mentioned above. In addition, the word position similarity calculation unit 43 may calculate degree of similarity only for documents in which the compound word is detected, and output the search result in descending order of degree of similarity to the client output unit 5.

For example, when a character string of "Tokyo-To" is input as a search query, sentences in which "Tokyo" and "To" exist are specified. This processing is similar to proximity processing using the sentence-based position information described so far. In the example shown in FIG. 17, each of the second sentence in document 1 and the first sentence in document 2 includes "Tokyo" and "To". Then, specified document ID and sentence number are referred to in the document storing DB 14, and it is checked whether the character string of "Tokyo-To" exits. This processing can be performed by scanning the whole sentence from the head part of the sentence. As a result, the character string information search unit 2 outputs only documents in which the character string exists (only documents in which adjacent words exist) to the similarity calculation unit 4', and the similarity calculation unit 4' calculates degree of similarity, so that the search result can be presented from the client output unit.

It is possible to constitute each operation of the components of the information search apparatus of the above-mentioned embodiments as a program, and to install the program in a computer used as the information search apparatus in order to execute the program. Or the program can be distributed via a network.

Further, the constituted program can be stored in a hard disk, or in a portable recording medium such as a flexible disk, CD-ROM and the like in order to install the program in a computer or to distribute the program.

The present invention is not limited to the specifically disclosed embodiments, and variations and modifications may be made without departing from the scope of the invention.

INDUSTRIAL APPLICABILITY

The present invention can be applied to information search for obtaining desired information from large document sets such as a database by using an input character string.

The present international application claims priority based on Japanese patent application No. 2007-299784, filed in the JPO on Nov. 19, 2007 and the entire contents of the Japanese patent application No. 2007-299784 is incorporated herein by reference.

The invention claimed is:

1. An information search apparatus comprising:
a processor;
a memory that stores an index database (DB);
a character string input unit configured to obtain a character string from a client;
a character string information search unit configured to obtain information that includes the character string from the index DB;
a similarity calculation unit, implemented by the processor, configured to calculate degree of similarity between the character string and searched information; and
an output unit configured to output the searched information in descending order of the degree of similarity,
wherein the index DB stores each word with sentence-based occurrence position information, of each document where the word occurs, that indicates each position of sentences where the word occurs, and
when the input character string contains a plurality of words, the character string information search unit searches the index DB, based on each word, to obtain a document d including each word and occurrence positions of each word in the document d, and
the similarity calculation unit calculates a degree of agreement score(Q,d,k) between occurrence positions of the words by $$score(Q, d, k) \sum_{q_i \in Q} \sum_{q_j \in (Q - q_i)} \frac{1}{\alpha k + 1} count(Pos_d(q_i), Pos_{d_k}(q_j))$$

so as to calculate the degree of similarity based on the degree of agreement score (Q,d,k),
wherein Q indicates a set of words obtained by dividing the character string, $Pos_d(q_i)$ indicates an occurrence position of a word $q_i$ in the document d, $Pos_{dk}(q_i)$ indicates a value obtained by subtracting k from an occurrence position of a word $q_i$ in the document d, k indicates a counter value, α indicates a coefficient, and Count (Pos,Pos) indicates a function for receiving two pieces of position data and returning a degree of agreement.

2. The information search apparatus as claimed in claim 1, wherein the occurrence position information is represented as a bit sequence,
the character string information search unit includes a unit configured to search the index DB to obtain the occurrence position of the word as the bit sequence, and
the similarity calculation unit includes a unit configured to obtain the degree of similarity by performing logical calculation of bits using the bit sequence of the occurrence position information of the index DB.

3. The information search apparatus as claimed in claim 1, further comprising:
a character string selection unit configured, when the input character string is composed of a plurality of words, to refer to a proximity unconsidered word list storing unit that stores words for which proximity is not considered, and to determine that the word is one for which proximity is not considered when the word exists in the proximity unconsidered word list storing unit,
wherein the character string information search unit includes a unit configured to search the index DB assuming that the word exists in every sentence as to the word determined to be one for which proximity is not considered by the character string selection unit.

4. The information search apparatus as claimed in claim 1, the character string information search unit further comprising:
an adjacency check unit configured, when the index DB stores sentence-based occurrence position information of each word, to search the index DB based on a plurality of words obtained from the input character string, detect an ID of a sentence in which the plurality of words exist, and search a document storing DB for the sentence corresponding to the ID, and, output the search result to the similarity calculation unit only when the sentence includes the input character string.

5. The information search apparatus as claimed in claim 1, wherein the similarity calculation unit calculates the degree of similarity sim(Q, d) between the character string and the document d by $$sim(Q, d) = \sum_{k=0}^{n} score(Q, d, k)$$

wherein n indicates a predetermined value equal to or greater than 0.

6. An information search method in an apparatus for obtaining a character string from a client, obtaining information that includes the character string from an index database (DB), calculating degree of similarity between the character string and searched information, and outputting the searched information in descending order of the degree of similarity, wherein the index DB stores each word with sentence-based occurrence position information, of each document where the word occurs, that indicates each position of sentences where the word occurs, and the information search method comprising:
a character string information search step in which, when the input character string contains a plurality of words, a character string information search unit searches the index DB, based on each word, to obtain a document d including each word and occurrence positions of each word in the document d, and a step in which a similarity calculation unit calculates a degree of agreement score(Q,d,k) between occurrence positions of the words by $$\text{score}(Q, d, k) \sum_{q_i \in Q} \sum_{q_j \in (Q-q_i)} \frac{1}{\alpha k + 1} \text{count}(Pos_d(q_i), Pos_{d_k}(q_j))$$

so as to calculate the degree of similarity based on the degree of agreement score (Q,d,k), wherein Q indicates a set of words obtained by dividing the character string, $Pos_d(q_i)$ indicates an occurrence position of a word $q_i$ in the document d, $Pos_{dk}(q_i)$ indicates a value obtained by subtracting k from an occurrence position of a word $q_i$ in the document d, k indicates a counter value, $\alpha$ indicates a coefficient, and Count (Pos,Pos) indicates a function for receiving two pieces of position data and returning a degree of agreement.

7. The information search method as claimed in claim 6, wherein, the occurrence position information is represented as a bit sequence, in the character string information search step, the character string information search unit searches the index DB to obtain the occurrence position information of the word as the bit sequence, and in the similarity calculation step, the similarity calculation unit obtains the degree of similarity by performing logical calculation of bits using the bit sequence of the occurrence position information of the index DB.

8. The information search method as claimed in claim 6, further comprising:

a character string selection step for, when the input character string is composed of a plurality of words, referring to a proximity unconsidered word list storing unit that stores words for which proximity is not considered to determine that the word is one for which proximity is not considered when the word exists in the proximity unconsidered word list storing unit, wherein, in the character string information search step, the character string information search unit searches the index DB assuming that the word exists in every sentence as to the word determined to be one for which proximity is not considered in the character string selection step.

9. The information search method as claimed in claim 6, wherein, in the character string information search step, when the index DB stores sentence-based occurrence position information of each word, the character string information search unit searches the index DB based on a plurality of words obtained from the input character string, detects an ID of a sentence in which the plurality of words exist, and searches a document storing DB for the sentence corresponding to the ID, and, outputs the search result to the similarity calculation unit only when the sentence includes the input character string.

10. The information search method as claimed in claim 6, wherein the similarity calculation unit calculates the degree of similarity sim(Q, d) between the character string and the document d by $$sim(Q, d) = \sum_{k=0}^{n} \text{score}(Q, d, k)$$

wherein n indicates a predetermined value equal to or greater than 0.

11. A non-transitory computer readable recording medium that stores an information search program which causes an information search apparatus for obtaining a character string from a client, obtaining information that includes the character string from an index database (DB), calculating degree of similarity between the character string and searched information, and outputting the searched information in descending order of the degree of similarity, wherein the index DB stores each word with sentence-based occurrence position information, of each document where the word occurs, that indicates each position of sentences where the word occurs, to perform a method comprising:

a character string information search step in which, when the input character string contains a plurality of words, a character string information search unit searches the index DB, based on each word, to obtain a document d including each word and occurrence positions of each word in the document d, and a step in which a similarity calculation unit calculates a degree of agreement score(Q,d,k) between occurrence positions of the words by $$\text{score}(Q, d, k) \sum_{q_i \in Q} \sum_{q_j \in (Q-q_i)} \frac{1}{\alpha k + 1} \text{count}(Pos_d(q_i), Pos_{d_k}(q_j))$$

so as to calculate the degree of similarity based on the degree of agreement score (Q,d,k), wherein Q indicates a set of words obtained by dividing the character string, $Pos_d(q_i)$ indicates an occurrence position of a word $q_i$ in the document d, $Pos_{dk}(q_i)$ indicates a value obtained by subtracting k from an occurrence position of a word $q_i$ in the document d, k indicates a counter value, $\alpha$ indicates a coefficient, and Count (Pos,Pos) indicates a function for receiving two pieces of position data and returning a degree of agreement.

12. The non-transitory computer readable recording medium as claimed in claim 11, wherein the similarity calculation unit calculates the degree of similarity sim(Q, d) between the character string and the document d by $$sim(Q, d) = \sum_{k=0}^{n} \text{score}(Q, d, k)$$

wherein n indicates a predetermined value equal to or greater than 0.

* * * * *